United States Patent [19]

Takashima

[11] Patent Number: 4,564,526
[45] Date of Patent: Jan. 14, 1986

[54] METHOD FOR MANUFACTURING PROCESSED FOODSTUFFS FROM ALGAE AS MATERIALS

[75] Inventor: Shuji Takashima, Numazu, Japan

[73] Assignee: Kabushiki Kaisha Yamagataya Nori Ten, Tokyo, Japan

[21] Appl. No.: 532,183

[22] Filed: Sep. 14, 1983

[30] Foreign Application Priority Data

Sep. 22, 1982 [JP] Japan .................. 57-165871

[51] Int. Cl.$^4$ .......... A23D 5/02; A23L 1/06; A23L 1/24; A23L 1/337
[52] U.S. Cl. .................. 426/262; 426/271; 426/321; 426/575; 426/581; 426/589; 426/602; 426/605
[58] Field of Search ............ 426/262, 271, 575, 442, 426/321, 581, 589, 602, 605

[56] References Cited

U.S. PATENT DOCUMENTS 3,876,810  4/1975  Carbonniere ............... 426/807 X
4,180,595 12/1979  Lauredan ..................... 426/575

FOREIGN PATENT DOCUMENTS 0099177  6/1982  Japan ................... 426/575
8000876  1/1983  Japan ................... 426/262
  20357  of 1899 United Kingdom ....... 426/575

Primary Examiner—Robert Yoncoskie
Attorney, Agent, or Firm—Wyatt Gerber Shoup

[57] ABSTRACT

A method for manufacturing a processed foodstuff from an alga as a material, which comprises heating the alga in water or a flavoring liquid in the presence of a metal in order to carry out the fixation of a color of the metal, and then adding various additives to the alga in compliance with a use of the processed foodstuff.

4 Claims, No Drawings

METHOD FOR MANUFACTURING PROCESSED FOODSTUFFS FROM ALGAE AS MATERIALS

The present invention relates to a method for manufacturing processed foodstuffs from algae.

The algae have excellent properties as foodstuffs, since they contain vitamins and minerals in a high content as well as useful vegetable fibers. Therefore, it is desirable that algae be brought to markets in processed foodstuffs such as jam, dressing and mayonnaise by conforming the algae to a westernized diet, or as favorite oriental foods such as jelly and soft sweet bean jelly. However, the algae, when thermally processed in a liquid, will convert to a brown color and will consequently be less visually attractive. Therefore, their commercial value in processed foodstuffs is reduced. For this reason, the algae have heretofore been used as materials for products such as dried laver, sliced sea tangle and salted seaweed which do not require extensive processing.

The present invention alleviates the above-mentioned problem, and its object is to provide a method for manufacturing new processed foodstuffs by employing algae materials the vivid colors of which are fixed and maintained in order to expand uses of the algae in processed foodstuffs.

The method of the present invention comprises the following steps:

(i) The algae is heated in an aqueous medium which may be a flavoring liquid in the presence of a trace amount of metal. As a result, the dyestuffs which cause red and blue colors and are labile in heat are destroyed, so that the color of the algae changes slightly. The trace metal may be brought in the water or flavoring liquid by using a vessel made of the selected metal or placing a small piece of the selected metal in the vessel. The amount of metal to be dissolved in water or the flavoring liquid is theoretically equimolar with chlorophyll present in the algae as shown in the following reaction formula, but practically a slight molar excess of metal is preferable. In short, the amount of the metal is such that the following reaction occurs to fix the chlorophyll color.

The dissolution of the metal is effected by boiling for a proper period of time, in a vessel of the selected metal or with pieces of the selected metal placed in the vessel. Preferably, when the metal is copper, a copper pot is utilized, or in the case that it is zinc, a galvanized sheet iron vessel is used.

(ii) When heating is continued, the magnesium atom in each porphyrin ring of chlorophyll included in the algae is replaced with the metal atom dissolved from the metal vessel or the metal pieces therein. For example, when copper is used, the following reaction will occur:

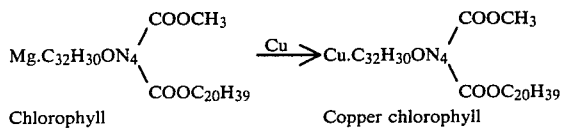

Chlorophyll      Copper chlorophyll

The produced copper chlorophyll exhibits a vivid green color and is stable to heat.

(iii) The thus obtained algae having the vivid green color are dehydrated for example by a centrifugal dehydrator, and there are added thereto various additives such as sugar, pectin, citric acid and fruit juice, followed by processing in order to manufacture desired foodstuffs.

For example, for the preparation of a jam, proper amounts of sugar, pectin and citric acid are used as the additives. In the case of jelly, there are used sugar, carragheenin, dipotassium phosphate, malic acid, wine and the like. In the case of dressing, onion, salad oil, cider vinegar, salt, garlic powder and the like are used. In the case of mayonnaise, there are used salad oil, rice vinegar, yolk, a proper amount of sugar, salt, Western mustard powder, pepper and the like. For the manufacture of juice, a proper fruit juice such as apple juice, sugar, citric acid and the like are added to the algae with the fixed color. For the manufacture of butter or margarin pectin, citric acid, sugar and the like are employed. For the manufacture of ketchup, there are used rice vinegar, sugar, salt, garlic powder, cinnamon powder, clove powder, Guinea pepper powder and the like. Further, by using agar, sugar, salt and the like, soft sweet bean jelly can be made. Furthermore, by the employment of powdery beef extract, garlic powder and pepper, pastes of the algae can be made.

The foregoing additives are merely illustrative. A variety of additional materials can be employed in accordance with standard procedures for the preparation of processed foodstuffs.

The following non-limiting examples are given by way of illustration only.

EXAMPLE 1

Water was placed in a copper pot and was heated to boiling. The selected algae was added and boiling continued. When the used alga was dry single-petaled weed (Japanese Name: Hitoegusa), 30 g of it was continuously boiled in 3 liters of water for a period of 2 hours; when it was dry green laver, 30 g of it was boiled in 4 liters of water for 2.5 hours; when it was dry *Ulopteryx pinnatifida*, 50 g was boiled in 3 liters of water for 1.5 hours; for dry sea tangle, 40 g was boiled in 4 liters of water for 2 hours; with dry Suizenji moss powder, 20 g was boiled in 3 liters of water for 1.5 hours, and in all cases the green color was fixed in the alga. In each case the algae were centrifugally dehydrated and 50 g was transferred to a beaker. There were then added 40 ml of water, 60 g of sugar, 1 g of pectin and 0.5 g of citric acid, and heating was continued until the soluble solid material content reached a level of 60%. In this way, jam of each vivid green alga was made as much as approximately 100 g.

EXAMPLE 2

Example 1 was repeated in order to fix a green color to the respective algae, followed by centrifugal dehydration. In a beaker, 25 g of each alga was placed, and there were added 30 g of sugar, 2 g of carragheenin, 0.8 g of dipotassium phosphate, 0.8 g of malic acid and sufficient water to bring the total amount to 200 ml, followed by heating. When these additives were dissolved, the heating was terminated, and 50 ml of wine was added. The mixture was cooled to effect solidification. Thus, jelly of each vivid green alga was obtained in an amount of approximately 250 g.

EXAMPLE 3

Example 1 was repeated in order to fix the green color in the respective algae, followed by centrifugal dehydration. Together with 20 g of onion, 25 g of each alga was then mixed in a homogenizer. The resultant paste was transferred to a beaker, and there were added thereto 40 g of salad oil, 30 g of malic acid, 5 g of salt and 0.5 g of garlic powder, followed by agitation. In this way, a salad dressing of each brilliant green alga was obtained in an amount of approximately 120 g.

EXAMPLE 4

Example 1 was repeated in order to fix the green color to the respective algae, followed by centrifugal dehydration. Twenty five grams of each alga was then homogenized to render it pasty. Separately, 75 g of salad oil, 12 g of rice vinegar and 12.5 g of yolk were treated in a homogenizer to form a paste. The pasty material was transferred to a beaker, and the pasty alga was added. Further, 2.5 g of sugar, 2 g of salt, 4 g of Western mustard powder and 0.6 g of pepper were also added and agitated. In this manner, mayonnaise including each brilliant green alga was manufactured in an amount approximately 130 g.

EXAMPLE 5

Example 1 was repeated in order to fix a green color in the respective algae, followed by centrifugal dehydration. In a homogenizer, 25 g of each alga was then treated to make it pasty. Each pasty material thus prepared was transferred to a beaker, and water was added to bring the volume to approximately 100 ml. Next, 25 ml of apple juice, 10 g of sugar and 0.2 g of citric acid were added, followed by agitation. In this way, a drink containing each vivid green alga was produced in an amount of about 125 ml.

EXAMPLE 6

Example 1 was repeated in order to fix the green color in the respective algae, followed by centrifugal dehydration. In a homogenizer, 25 g of each alga was then treated to make it pasty. Next, 60 g of butter or margarin was placed in a beaker, and it was melted. Each pasty alga together with 50 ml of water were added to the beaker. Further, 240 g of sugar, 1 g of pectin and 5 g of citric acid were added and the mixture warmed with agitation. The warming operation was carried out at 50° C. or less. Thus, butter including each brilliant green alga was made and its amount was approximately 430 g.

EXAMPLE 7

Example 1 was repeated in order to fix the green color in the respective algae, followed by centrifugal dehydration. Together with 3 g of onion, 125 g of each alga was then treated in a homogenizer. The treated material was transferred to a beaker, and water was added to bring the total amount to approximately 200 ml. There were also, added 15 g of rice vinegar, 10 g of sugar, 2 g of salt, 0.1 g of garlic powder, 0.1 g of cinnamon powder, 0.1 g of clove powder and 0.02 g of Guinea pepper powder, and the resultant mixture was then agitated. In this way, ketchup of each clear green alga was manufactured in an amount of about 230 g.

EXAMPLE 8

Water was placed in a galvanized sheet iron vessel, and was heated to boiling. Algae were then added and boiling continued. When the used alga is raw single-petaled weed, 250 g were continuously boiled in 8 liters of water for a period of 7 hours; when it was raw stalk *Ulopteryx pinnatifida,* 250 g were cut thinly and boiled in 4 liters of water for 3 hours; for dry seaweed, 25 g was boiled in 6 liters of water for 5 hours, in order to fix a green color to each alga. These algae each were centrifugally dehydrated, and 25 g of each one was transferred to a beaker. There were then added 30 g of sugar, 0.7 g of salt, 1.1 g of agar powder and water to bring the total amount to approximately 150 ml, followed by heating. The heating was continued until the additives dissolved, and the mixture cooled to effect solidification. Thus, soft sweet bean jelly of each vivid green alga was manufactured and its amount was about 150 g.

EXAMPLE 9

Example 8 was repeated in order to fix the green color in the respective algae, followed by centrifugal dehydration. Together with 2.5 g of powdery beef extract, 0.05 g of garlic powder and 0.05 g of pepper, 25 g of each alga above was treated in a homogenizer. Thus, paste including each vivid green color was produced in an amount of about 27 g.

EXAMPLE 10

Example 8 was repeated in order to fix the green color in the respective algae, followed by centrifugal dehydration. In a beaker, 125 g of each alga were placed, and then 55 ml of white soy sauce, 10 g of sugar and 2 g of L-sodium glutamate were added. Each mixture was boiled with agitation to avoid burning, to remove the moisture content. Thus, food boiled down in soy of each vivid green alga was manufactured in an amount of 130 g.

The method for manufacturing the processed foodstuffs from the algae (sea algae and fresh water algae) as the materials according to the present invention comprises fixing vivid colors in the algae and carrying out a subsequent processing following standard procedures for processed foodstuffs to enhance their commercial value and to adapt the processed foodstuffs containing algae to the modern diet markets. The algae can be used in foodstuffs having nutritionally excellent properties.

What is claimed is:

1. A method for the manufacture of processed food which comprises heating an algae selected form the group consisting of single-petaled weed, stripe green laver, *Ulopteryx pinnatifida,* sea tangle, sea moss, and mixtures thereof in an aqueous medium containing at least one metal selected from the group consisting of copper, zinc and cobalt at a temperature and for a sufficient time to replace at least a portion of the magnesium in the chlorophyll with the selected metal thereby to effect fixation of the green color and then mixing selected food materials with resulting algae to produce said processed foodstuff.

2. A method as in claim 1 wherein the metal is copper.

3. A method as in claim 1 wherein the metal is zinc.

4. A method as in claim 1 wherein the processed foodstuff is jam, jelly, salad dressing, mayonnaise, juice, butter, ketchup, sweet bean jelly, paste or a soy sauce.

* * * * *